United States Patent
Kawaura et al.

(10) Patent No.: US 8,578,992 B2
(45) Date of Patent: Nov. 12, 2013

(54) FRICTION WELDING APPARATUS

(75) Inventors: Koichi Kawaura, Kariya (JP);
Yasumasa Kuraya, Aichi-ken (JP);
Satoru Miyaji, Ohbu (JP)

(73) Assignees: Kabushiki Kaisha Toyota Jidoshokki,
Aichi-ken (JP); **Izumi Machine Mfg.
Co., Ltd.**, Aichi-ken (JP)

( * ) Notice: Subject to any disclaimer, the term of this patent is extended or adjusted under 35 U.S.C. 154(b) by 501 days.

(21) Appl. No.: 12/918,605

(22) PCT Filed: Feb. 22, 2008

(86) PCT No.: PCT/JP2008/053082
§ 371 (c)(1),
(2), (4) Date: Nov. 19, 2010

(87) PCT Pub. No.: WO2009/104275
PCT Pub. Date: Aug. 27, 2009

(65) Prior Publication Data
US 2011/0056629 A1     Mar. 10, 2011

(51) Int. Cl.
*B32B 37/00* (2006.01)
(52) U.S. Cl.
USPC ............. 156/358; 156/64; 156/73.5; 156/580
(58) Field of Classification Search
USPC ................... 156/64, 73.5, 358, 580; 264/68; 228/112.1, 114.5, 2.1, 2.3
See application file for complete search history.

(56) References Cited

U.S. PATENT DOCUMENTS

| | | | | |
|---|---|---|---|---|
| 3,591,068 A | * | 7/1971 | Farmer et al. | 228/2.3 |
| 3,627,189 A | * | 12/1971 | Ditto et al. | 228/2.3 |
| 3,699,639 A | * | 10/1972 | Ditto et al. | 228/113 |
| 3,753,820 A | * | 8/1973 | Ishikawa et al. | 156/73.5 |
| 3,827,138 A | * | 8/1974 | Needham et al. | 228/114.5 |
| 4,595,433 A | * | 6/1986 | Ford et al. | 156/64 |
| 4,721,546 A | * | 1/1988 | Clark et al. | 156/567 |
| 4,741,788 A | * | 5/1988 | Clark et al. | 156/64 |
| 4,743,331 A | * | 5/1988 | Nuttall et al. | 156/358 |
| 4,811,887 A | * | 3/1989 | King et al. | 228/2.3 |

FOREIGN PATENT DOCUMENTS

| | | |
|---|---|---|
| JP | 51-97564 A | 8/1976 |
| JP | 53-43056 A | 4/1978 |
| JP | 55-1960 A | 1/1980 |
| JP | 58-77788 A | 5/1983 |
| JP | 3-184680 A | 8/1991 |
| JP | 11-342480 A | 12/1999 |
| JP | 2000-84680 A | 3/2000 |

OTHER PUBLICATIONS

International Search Report for PCT/JP2008/053082, dated May 27, 2008.

* cited by examiner

*Primary Examiner* — James Sells
(74) *Attorney, Agent, or Firm* — Sughrue Mion, PLLC

(57) ABSTRACT

Disclosed is a friction welding apparatus in which electricity is supplied to a servo motor to rotate a spindle to thereby impart a fixed relative rotational motion to one workpiece and another workpiece, and, while doing so, the one workpiece and the other workpiece are brought into contact with each other and imparted a frictional thrust thereto to soften a bonding interface between the two workpieces. After this, the friction welding apparatus undergoes speed reduction until the RPM of the spindle becomes a phase adjustment RPM; when the RPM of the spindle attains the phase adjustment RPM, a clutch device is engaged with the spindle, and the electricity supply to the servo motor is cut off to stop the rotation of the spindle.

7 Claims, 4 Drawing Sheets

FRICTION WELDING APPARATUS

TECHNICAL FIELD

The present invention relates to a friction welding apparatus for bonding workpieces to each other by utilizing frictional heat.

BACKGROUND ART

Known examples of a friction welding apparatus of this type are disclosed in Patent Documents 1 and 2. Patent Document 1 discloses a technique in which a stopping device is operated through clutch engagement to perform phase adjustment on both workpieces. Patent Document 2 discloses a technique in which phase adjustment is performed on both workpieces through torque control and rotation frequency control of a servo motor.

Patent Document 1: JP 3-184680 A
Patent Document 2: JP 2000-84680 A

However, in Patent Document 1, the rotation frequency at which the engagement of both clutches is effected is, for example, 300 rpm, so that when both clutches are engaged with each other, the engagement portions may suffer breakage. Further, this engagement involves generation of large impulsive noise. For example, when there are two engagement portions for both clutches with respect to one rotation of the spindle side clutch, that is, when there exists an engagement portion for both clutches for each half rotation)(180° of the spindle side clutch, the engagement is effected without detecting the phases of both clutches, so that when both clutches are brought into engagement with each other, the spindle side clutch may rotate by 1° with respect to the mating clutch before being engaged after both clutches have started to be brought into contact with each other, or the spindle side clutch may rotate by 179° before being engaged. In the former case (i.e., when the spindle side clutch rotates by 1° before being engaged), the loss of rotational energy of the spindle due to the clutch engagement is small, so that it is possible to cause the stopping device to perform a predetermined operation with the rotational energy of the spindle. In this case, the phase precision in the bonding of both workpieces is satisfactory. On the other hand, in the latter case (i.e., when the spindle side clutch rotates by 179° before being engaged), the rotational energy loss of the spindle due to the clutch engagement is large, so that it is impossible to cause the stopping device to perform the predetermined operation with the rotational energy of the spindle. In this case, the phase precision in the bonding of both workpieces is unsatisfactory. In this way, the phase precision in the bonding of both workpieces may be satisfactory or unsatisfactory, resulting in variation in phase precision.

In Patent Document 2, immediately before the bonding of both workpieces, the electricity supply to the servo motor for rotating the spindle is cut off (i.e., servo-OFF is effected), thereby stopping the spindle. As a result, from the servo-OFF onward, the spindle can be rotated by inertial force, so that both workpieces are allowed to adhere to each other depending on the softened state (i.e., depending on the viscosity) of the contact portions thereof. That is, there is a new problem in that both workpieces are bonded together before a point has been reached where the phases of both workpieces coincide with each other, or after a point has been reached where the phases of both workpieces coincide with each other.

Thus, there is a need in the art for a friction welding apparatus which helps to achieve an improvement in terms of the bonding phase precision of both workpieces.

SUMMARY

A friction welding can include grasping devices respectively grasping two opposing workpieces in predetermined phases, a biasing device biasing the grasping devices toward each other, a servo motor driving a spindle equipped with one grasping device, a clutch device engaged with the spindle in a specific phase, a stopping device making a linear movement while engaged with an other end of a lever, the stopping device having one end engaged with the clutch device to rock and capable of being restored to regulate a stopping phase of the spindle, a damper device following the stopping device to offer resistance to the rotation of the spindle, and a stopping buffer device consisting of a pre-compressed laminated elastic member and constraining an operating end of the stopping device. Electricity can be supplied to the servo motor and the spindle can be rotated to thereby impart a fixed relative rotational motion to one workpiece and another workpiece, and, while doing so, the one workpiece and the another workpiece are brought into frictional contact with each other to soften a bonding interface between the two workpieces. Thereafter a speed reduction is effected until the RPM of the spindle becomes a phase adjustment RPM, when the RPM of the spindle attains the phase adjustment RPM, the clutch device is engaged with the spindle, and the electricity supply to the servo motor is cut off to stop the rotation of the spindle.

According to this construction, it is possible to engage the two clutches with each other such that the RPM of the spindle is a low speed RPM (e.g., 150 rpm), and that the phase of the spindle side clutch and the phase of the mating clutch coincide with each other. As a result, there is no fear of breakage of the engagement portions or generation of large impulsive noise as in the prior-art technique of Patent Document 1. Further, when the clutches are thus engaged with each other, the rotational energy loss of the spindle due to the engagement of the two clutches is small, so that it is possible to cause the stopping device to perform a predetermined operation with the rotational energy of the spindle. Thus, the phase precision in the bonding of the two workpieces is always satisfactory. As a result, there is no fear of the two workpieces being allowed to adhere to each other depending on the softened state of the contact portions thereof as in the prior-art technique of Patent Document 2.

BEST MODE FOR CARRYING OUT THE INVENTION

Figure 1:
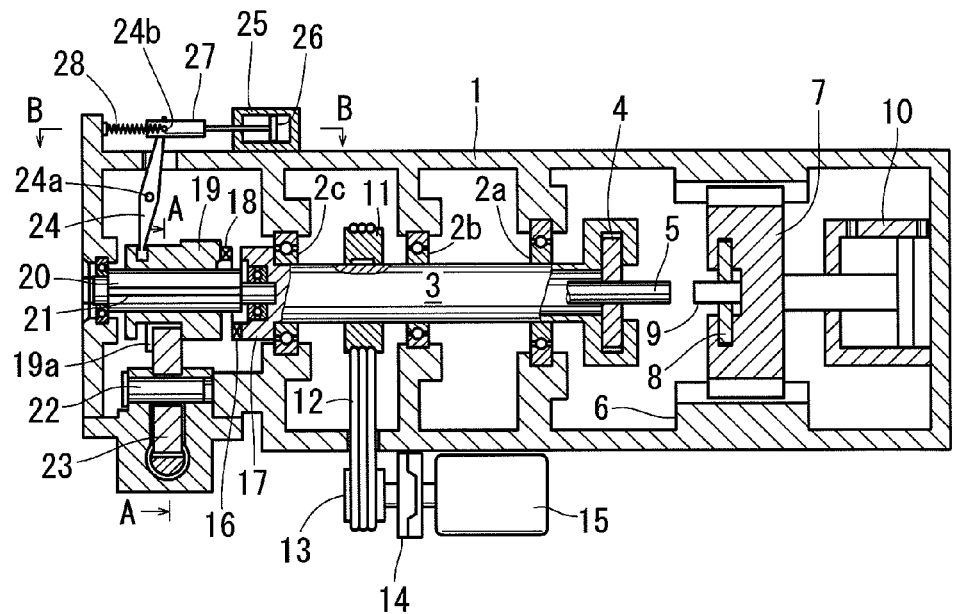
FIG. 1 is a sectional view of a friction welding apparatus according to an embodiment of the present invention.

In the following, a best mode for carrying out the present invention will be described with reference to the drawings. As shown in FIG. 1, one workpiece 5 is grasped by a chuck 4 on a spindle 3 so as to be coaxial with the spindle 3 which is rotatably supported by a casing 1 via bearings 2a, 2b, and 2c. The one workpiece 5 is brought into frictional contact with another workpiece 9 grasped by a chuck 8 via a table 7 so as to be slidable in the axial direction of the spindle 3 on a sliding member 6 that is integral with the casing 1.

For this purpose, the table 7 can be moved toward and away from the spindle 3 by a hydraulic device 10 and can cause pressurization on the spindle 3. The spindle 3 is rotated by a servo motor 15 via a pulley 11, a belt 12, a pulley 13, and an electromagnetic clutch 14.

On the side of the spindle 3 opposite to the chuck 4, there is provided a cam clutch 17 having a claw 16 integral therewith; on a side opposite thereto, a cam clutch 19 having a claw 18 is slidably supported by a shaft 20 by a key 21; and the shaft 20 is supported by the spindle 3 and the casing 1 so as to be coaxial with the spindle 3 and capable of relative rotation. When it is caused to slide to the right as seen in FIG. 1 by a clutch sliding lever 24 pivoted to the casing 1 via a pin 24a, the clutch 19 is engaged with the clutch 17 through engagement of the claws 18 and 16; conversely, when the clutch 19 is caused to slide to the left, the engagement thereof is released.

Figure 4:
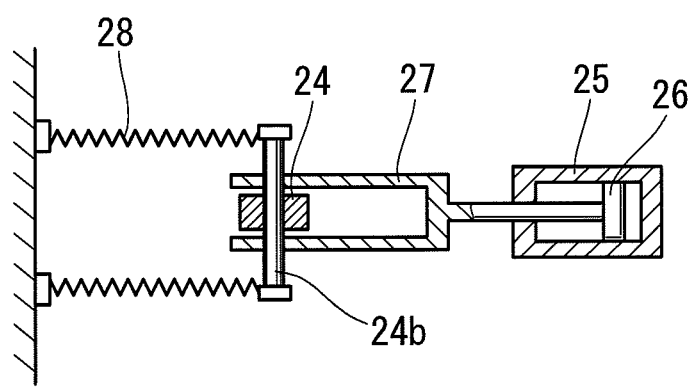
FIG. 4 is a sectional view taken along line B-B of FIG. 1.

As shown in FIG. 4, the clutch sliding lever 24 is constantly being pulled to the right as seen in the drawing against the tensile force of a spring 28 by a yoke 27 integral with a piston 26 of a hydraulic cylinder 25 via a pin 24b, so that clutches 17 and 19 are normally maintained in a disengaged state; when the hydraulic pressure on the rod side of the piston 26 is released (If necessary, a rod-side chamber is connected to a tank), the clutches 17 and 19 can be engaged with each other by the tensile force of the spring 28.

Figure 2:
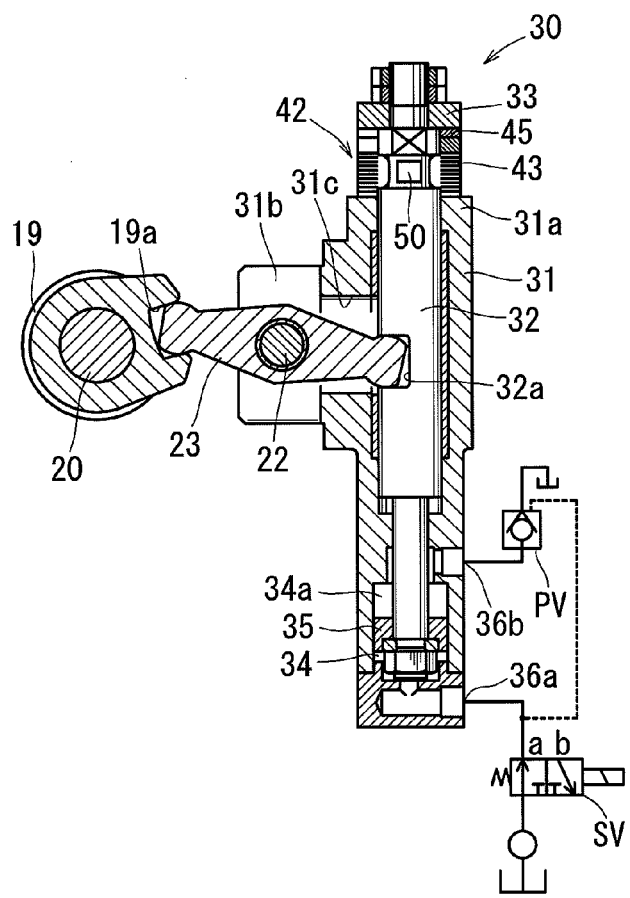
FIG. 2 is a sectional view taken along line A-A of FIG. 1, showing a transmission system of a phase adjustment element and a stopping device.
Figure 3:
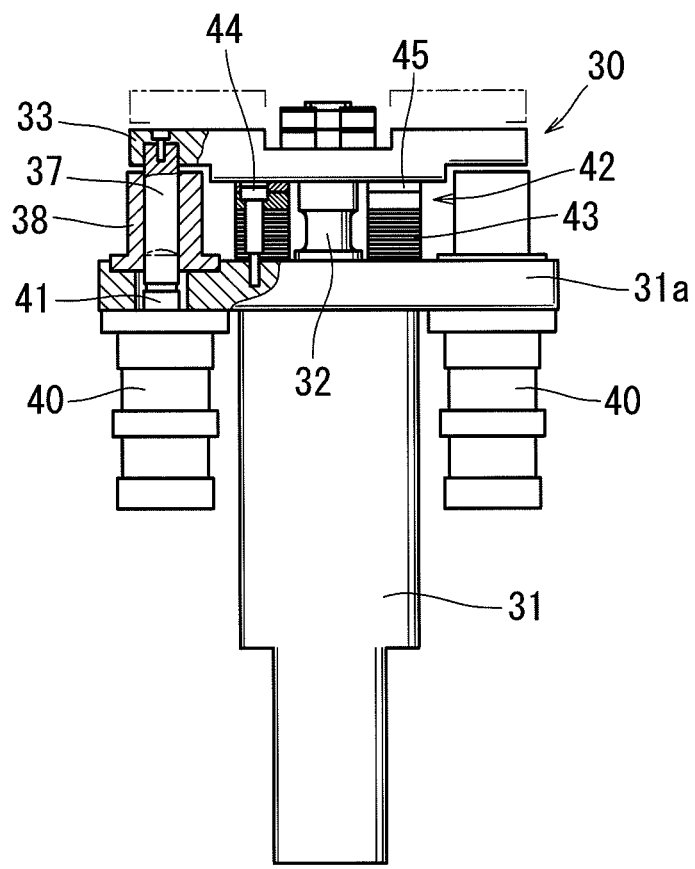
FIG. 3 is a front view, partially in section, of the stopping device.

On the other hand, a main body 31 of a stopping device 30 as shown in FIGS. 2 and 3 is connected to the casing 1, and a positioning plate 33 opposed to a seat plate portion 31a of the main body 31 is fastened to an upper exposed end of an intermediate shaft 32 inserted into the main body 31. And, a flange portion 3 1b extending from the main body 31 is provided with a shaft 22 extending parallel to the shaft 20, and one end of a lever 23 pivoted to the shaft 22 is engaged with a hook portion 19a formed integrally with the clutch 19; and the other end of the lever 23 is engaged with a hook portion 32a of the intermediate shaft 32 through a cutout portion 31c of the main body 31.

The lower portion as seen in the drawing of the main body 31 is formed as a cylinder chamber 34 biasing the positioning plate 33 to be restored to the normal state via the intermediate shaft 32, and a rod-like piston 35 extending integrally from the intermediate shaft 32 is inserted into the cylinder chamber 34. Symbol SV indicates an electromagnetic changeover valve for supplying and discharging pressure oil to and from the cylinder chamber 34 via a port 34a, and symbol PV indicates a prefill valve for supplying and discharging working fluid to and from a back pressure chamber 34a via a port 36b through pilot control.

At symmetrical positions aside the body portion of the main body 31, the positioning plate 33 is provided with a pair of pushing rods 37 extending vertically downwards; the pushing rods 37 are guided by sleeves 38 fixed to the seat plate portion 38a, and the lower end surfaces thereof interfere with piston caps 41 of damper devices 40 coaxially attached to the lower surface of the seat plate portion 31a.

The damper devices 40 are not shown in detail; when the inner pistons are pushed in via the piston caps 41 by the pushing rods 37 operating (descending) together with the positioning plate 33, working oil is ejected from a group of orifices provided in the side surface of the cylinder; due to the dynamic pressure resistance loss at the time of ejection, the impact energy (the rotational energy of the spindle 3) is transformed to heat energy, which is dissipated of its own accord into the atmosphere from the surfaces of the damper devices 40. That is, due to this energy absorption of the damper devices 40, an effective resistance is offered to the rotation of the spindle 3 via a series of transmission systems.

Further, the seat plate portion 31a is provided with a horseshoe-shaped stopping buffer device 42 constraining the operating end of the positioning plate 33 and arranged so as to surround the intermediate shaft 32; a desired pre-compression is imparted by an adjustment bolt 44 to a laminate elastic member 43 provided on the stopping buffer device 42 and consisting of a flat-plate-shaped urethane rubber. Numeral 45 indicates a replaceable spacer mounted for the purpose of phase angle adjustment, and numeral 50 indicates a sensor consisting, for example, of a strain gauge for detecting physical displacement (expansion) amount of the intermediate shaft 32 based on the stop impact; an overload on the stopping device 40 is warned of via a warning device (not shown) based on a predetermined detection value, thereby helping to examine and change the friction welding condition, etc.

Figure 6:
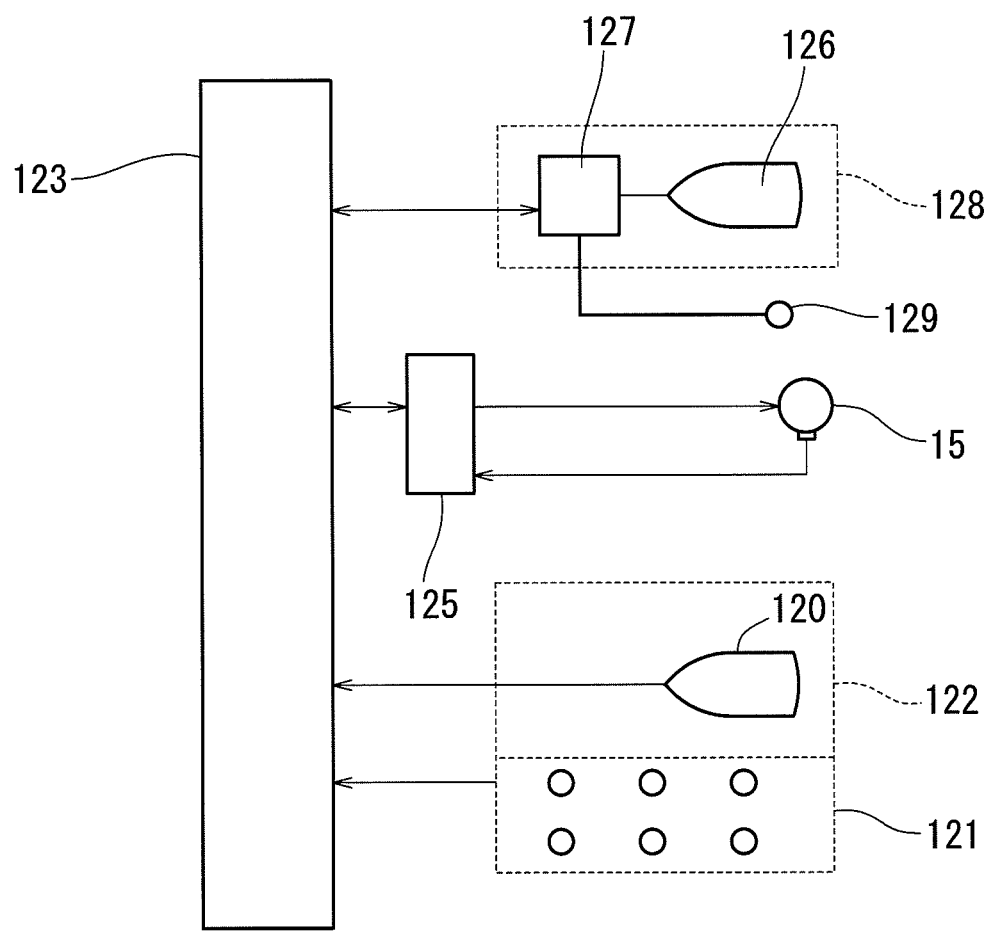
FIG. 6 is a configuration diagram of a control device.

The RPM of the servo motor 15 is changed by a control device shown in FIG. 6; in this embodiment, setting is made such that the high-speed RPM imparted to the spindle 3 for frictional heat generation is 1800 rpm, and that the low-speed RPM imparted to the spindle 3 for phase correction is 150 rpm; and, abrupt speed reduction from the high-speed rotation of the rotation system of 1800 rpm to the low-speed rotation of 150 rpm is effected through torque control of the servo motor 15.

In this control device, an operation panel 122 consisting of a CRT 120 and a digital switch 121 is connected to a controller 123. The servo motor 15 is connected to the controller 123 via a rotation servo driver (servo amplifier) 125. Further, a quality assurance device 128 consisting of a CRT 126 and a CPU 127 is connected to the controller; and a spindle tachometer 129 is connected to the quality assurance device 128, whereby it is possible to effect signal transmission related to the rotation (rotation, phase, and torque) of the spindle 3. It is also possible to adopt a rotation signal of the servo motor 15. The servo motor 15 adopted in this embodiment is one outputting a 10000-pulse signal with respect to one rotation, i.e., 360 degrees, and rotation position detection is effected with high precision by the controller 123.

Figure 7:
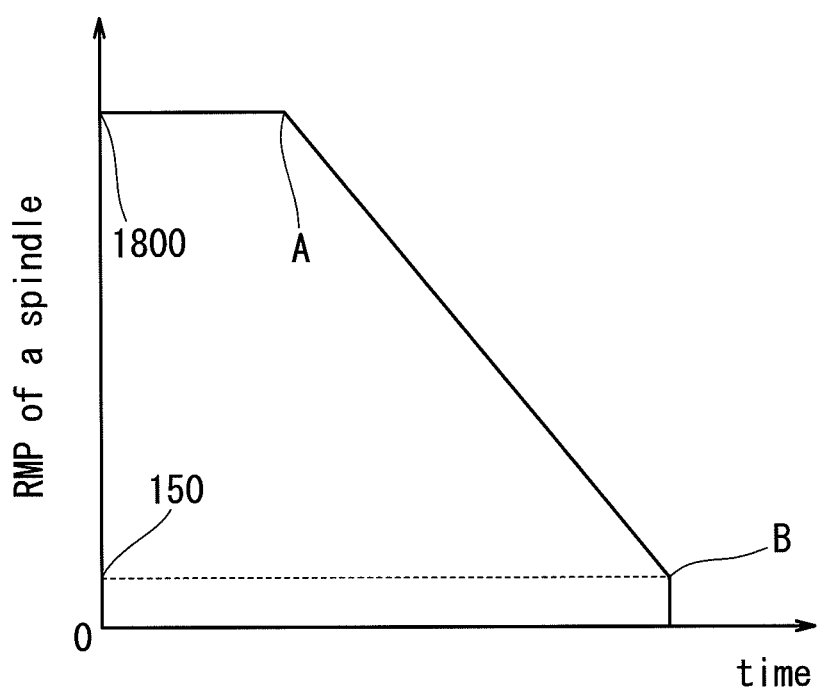
FIG. 7 is an explanatory view illustrating how a RPM of a spindle changes during a phase adjustment.

The operation of this embodiment, constructed as described above, will be illustrated. The two workpieces 5 and 9 are held respectively by the chucks 4 and 8 in predetermined phases; in the normal state, in which the electromagnetic clutch 14 is engaged, the table 7 is advanced (i.e., caused to slide to the left as seen in the drawing) along the sliding table 6 by the hydraulic device 10 while rotating the spindle 3 at a prescribed high RPM, e.g., 1800 rpm, bringing the two workpieces 5 and 9 into friction contact with each other under a certain pressure. When the contact portions of the two workpieces 5 and 9 have reached a temperature high enough for welding, the frictional heat generation process is regarded as completed (point A in FIG. 7), and the timing is detected by a timer or an amount of an approach margin or the like. RPM control and torque control are effected on the servo motor 15 based on this detection signal, and abrupt deceleration is effected until the spindle 3 attains a prescribed low RPM, e.g., 150 rpm (point B in FIG. 7).

Figure 5A:
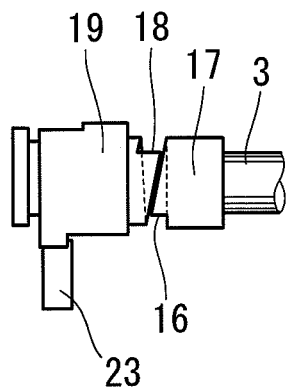
FIG. 5 is an explanatory view illustrating how clutch engagement is effected.
Figure 5B:
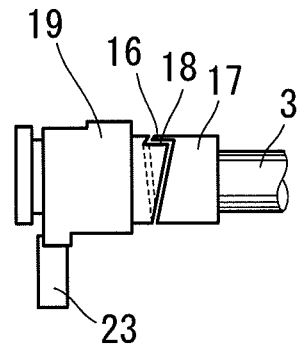

Immediately before the spindle 3 is reduced to the prescribed low RPM, or substantially simultaneously with that, the hydraulic pressure of the hydraulic cylinder 25 is released, and the clutch 19 is caused to slide to the right as seen in the drawing along the shaft 20 via the clutch sliding lever 24 by a spring 28 (or with pressure positively applied to a hydraulic cylinder 25 also from the opposite side); then, the clutch 19 is engaged with the clutch 17 rotating together with the spindle as shown in FIGS. 5(A) and 5(B), and the device for phase correction (including the clutch 19, the lever 23, and the stopping device 30) is engaged with the spindle 3 in a constant-phase relationship, whereby the preparation stage for phase correction is completed.

The two clutches 17 and 19 are engaged with each other such that the RPM of the spindle 3 is a low RPM (which, in this example, is 150 rpm), and that the phase of the clutch 17 on the spindle 3 side and the phase of the mating clutch 19 coincide with each other. The RPM and phase of the spindle 3 at this time corresponds to the "phase adjustment RPM". In this way, the phase adjustment RPM is an RPM obtained by taking into account not only the RPM but also the phase.

This is effected through control of the servo motor 15 by the control device. Since the two clutches 17 and 19 are thus engaged with each other, there is no breakage of the engagement portions or generation of large impulsive noise as in the prior-art technique of Patent Document 1. The control device cuts off the electricity supply to the servo motor 15 at an appropriate position between the engagement position of the two clutches 17 and 19 and the descending end of the positioning plate 33 (the position where it comes into contact with the laminated elastic member 43).

In relation to the engagement operation of the clutch 19, the electromagnetic change-over valve SV is switched from position a to position b, and the lever 23, which is engaged with the hook portion 19a on the clutch 19 as the clutch 19 rotates, rocks around the shaft 22; at the same time, the intermediate shaft 32, which has been at the ascending end, also makes a linear movement via the hook portion 32a with which the object end of the lever 23 is engaged (See FIG. 2).

The pushing rods 37 are connected to the intermediate shaft 32 via the positioning plate 33, and the descending pushing rods 37 interfere with the piston caps 41 to push in the cylinders (not shown) in the damper devices 40; due to the peculiar function of the damper devices 40, that is, the dynamic pressure resistance loss caused by the ejection of working oil form the orifice group, the impact energy is absorbed, and abrupt resistance (braking) is imparted to the spindle 3 via a series of transmission systems.

In this way, the spindle 3 is decelerated while the driving by the servo motor 15 is being continued; at the position where the positioning plate 33 collides with the stopping buffer device 42 and where the laminated elastic member 43 undergoes elastic deformation, the descending motion of the stopping device 30 is braked, and the phases of the two workpieces 5 and 9 are matched with each other through the constant-phase stopping of the spindle 3.

As already described, at the time of this stopping of the spindle 3, the two clutches 17 and 19 are engaged with each other such that their respective phases coincide with each other, so that the loss of the rotational energy of the spindle 3 due to the engagement of the two clutches 17 and 19 is small; thus, it is possible to cause the stopping device 30 to perform a predetermined operation with the rotational energy of the spindle 3. Thus, the phase precision in the bonding of the two workpieces 5 and 9 is always satisfactory. Thus, there is generated no variation in phase precision as in the prior-art technique of Patent Document 1. Further, since the spindle 3 is thus stopped by the stopping device 30, there is no fear of the two workpieces being allowed to adhere to each other depending upon the softened state of the contact portions thereof as in the prior-art technique of Patent Document 2.

After this, the clutch 14 is disengaged, and upset pressurization is continued for some time before completing the friction welding. In this case, a repulsive force of the stopping impact acts on the intermediate shaft 32 at the operation end of the stopping device 30; however, during the descent of the intermediate shaft, working oil is introduced into the back pressure chamber 34a via the prefill valve PV, and the above-mentioned repulsive force is effectively suppressed by the reverse flow preventing action of the valve PV.

Further, a predetermined pre-compression is imparted to the laminated elastic member 43 mitigating the stopping impact, and the elastic reaction force is artfully attenuated; furthermore, even if some disparity is generated in the impulsive force of the positioning plate 33 based on the frictional resistance of the workpieces 5 and 9, this is effectively absorbed within a minute displacement range of the laminated elastic member 43.

After the completion of the friction welding, the working oil is absorbed by the hydraulic cylinder 25, and the clutch 19 is disengaged; upon this, the electromagnetic change-over valve SV is switched to position a again, and pressure oil is also supplied to the cylinder chamber 34, with the stopping device 30, the lever 23, and the clutch 19 being restored to the normal state. In particular, in this embodiment, a sensor (strain gauge) 50 is attached to the intermediate shaft 32 detecting a physical displacement (expansion) thereof based on the stopping impact, and an overload of the stopping device 30 is warned of by a warning device according to a predetermined detection value, so that this embodiment is also suitably applicable to the repair of a portion with any abnormality, and the examination and altering of the friction welding condition.

By preparing several kinds of spacers 45 differing in thickness and placing a selected spacer 45 on the stopping buffer device 42, or by attaching one so as to cover the lower surface of the positioning plate 33, it is possible to perform fine adjustment of the phase angle adjustment precision with a still higher level.

What has been described above only relates to one embodiment of the present invention, and is not to be limited in the above-described configuration.

In the above-described embodiment, the side opposed to the spindle 3 constituting the rotation side slides. However, this should not be limited in this configuration; it is also possible to adopt a construction in which the spindle 3 side constituting the rotation side slides.

The invention claimed is:

1. A friction welding apparatus comprising:
    grasping devices respectively grasping two opposing workpieces in predetermined phases;
    a biasing device biasing the grasping devices toward each other;
    a servo motor driving a spindle equipped with one of the grasping devices;
    a clutch device engaged with the spindle in a specific phase;
    a stopping device making a linear movement while engaged with an end of a lever, the another end of the lever engaged with the clutch device, and the lever rocks, and the stopping device capable of being restored to regulate a stopping phase of the spindle;
    a damper device following the stopping device to offer resistance to the rotation of the spindle; and
    a stopping buffer device consisting of a pre-compressed laminated elastic member and constraining an operating end of the stopping device, wherein electricity is supplied to the servo motor and the spindle is rotated to thereby rotate one workpiece and in relation to another workpiece, the one workpiece and the another workpiece are brought into frictional contact with each other to soften a bonding interface between the two workpieces, thereafter a speed reduction is effected until the RPM of the spindle becomes a phase adjustment RPM, when the RPM of the spindle attains the phase adjustment RPM, the clutch device is engaged with the spindle, and the electricity supply to the servo motor is cut off to stop the rotation of the spindle.

2. The friction welding apparatus of claim 1 wherein the clutch device includes a first mating clutch and a second mating clutch.

3. The friction welding apparatus of claim 2 wherein the phase adjustment RPM is determined by the RPM of the spindle, and the phase of the first and second mating clutches in relation to each other.

4. The friction welding apparatus of claim 1 further including a control device, an operation panel having a first CRT and a digital switch connected to a controller.

5. The friction welding apparatus of claim 4 wherein the servo motor is connected to the controller via a rotation servo driver.

6. The friction welding apparatus of claim 5 further including a quality assurance device including a second CRT and a CPU connected to the controller; a spindle tachometer connected to the CPU, whereby it is possible to effect signal transmission related to the rotation of the spindle.

7. A friction welding apparatus comprising:
a servo motor configured to rotate a spindle to rotate one workpiece in relation to another workpiece,
a clutch device configured to engage with the spindle,
an electricity supply configured to supply electricity to the servo motor; and
an electronic control unit, including program logic, configured to perform:
controlling the spindle to rotate the one workpiece and the other workpiece at a predetermined RPM,
controlling the servo motor to bring the one workpiece and the other workpiece into frictional contact with each other to soften a bonding interface between the one workpiece and the other workpiece,
controlling the servo motor to reduce speed until the RPM of the spindle becomes a phase adjustment RPM,
controlling the clutch device to engage with the spindle when the RPM of the spindle attains the phase adjustment RPM, and
cutting off the electricity supply to the servo motor to stop the rotation of the spindle.

* * * * *